United States Patent
Kutschbach et al.

(10) Patent No.: US 11,899,424 B2
(45) Date of Patent: Feb. 13, 2024

(54) METHOD FOR CHECKING A TIME-DISCRETE SIGNAL VALUE OF A SENSOR FOR FREEDOM FROM ERRORS

(71) Applicant: ebm-papst Landshut GmbH, Landshut (DE)

(72) Inventors: Frank Kutschbach, Westerkappeln (DE); Franz Riedmueller, Attenhofen (DE); Stephan Wald, Altenberge (DE); Markus Weingart, Rottenburg (DE); Anton Berghammer, Attenhofen (DE); Robert Goldner, Landshut (DE); Erich Greiner, Schalkham (DE); Volker Kleine, Bissendorf (DE)

(73) Assignee: ebm-papst Landshut GmbH, Landshut (DE)

(*) Notice: Subject to any disclaimer, the term of this patent is extended or adjusted under 35 U.S.C. 154(b) by 749 days.

(21) Appl. No.: 16/962,057

(22) PCT Filed: Dec. 18, 2018

(86) PCT No.: PCT/EP2018/085695
§ 371 (c)(1),
(2) Date: Jul. 14, 2020

(87) PCT Pub. No.: WO2019/141475
PCT Pub. Date: Jul. 25, 2019

(65) Prior Publication Data
US 2020/0409332 A1    Dec. 31, 2020

(30) Foreign Application Priority Data
Jan. 16, 2018  (DE) .................... 10 2018 100 878.3

(51) Int. Cl.
*G05B 19/00*  (2006.01)
*G05B 19/4063*  (2006.01)
(Continued)

(52) U.S. Cl.
CPC .......... *G05B 19/4063* (2013.01); *G01P 21/00* (2013.01); *G05B 19/39* (2013.01); *G05B 2219/34484* (2013.01)

(58) Field of Classification Search
CPC ................ G05B 19/4063; G05B 19/39; G05B 2219/34484; G05B 2219/37181;
(Continued)

(56) References Cited

U.S. PATENT DOCUMENTS

2008/0176530 A1    7/2008  Kuhn et al.
2009/0072986 A1*   3/2009  Bussert .............. G05B 19/4063
                                                         340/679

FOREIGN PATENT DOCUMENTS

DE    102006046286 A1    6/2007
DE    102015211258 A1    12/2016
WO    WO-2005109132 A1 * 11/2005  ............. G05B 19/39

OTHER PUBLICATIONS

International Search Report dated Apr. 17, 2019, which issued in corresponding PCT Patent Application No. PCT/EP2018/085695.

* cited by examiner

*Primary Examiner* — Robert R Raevis
(74) *Attorney, Agent, or Firm* — Dickinson Wright PLLC

(57) ABSTRACT

The invention relates to a method for checking a time-discrete signal value of a sensor for freedom from errors, wherein the signal value of the sensor is converted into a first measured value and a second measured value by two different evaluating devices of an electronic system, wherein the first and second measured values are transmitted to a control system by the electronic system, and the control system calculates a first control signal from the first measured value and, in parallel thereto, a second control signal from the second measured value, wherein the control system comprises a comparator which compares the first control
(Continued)

signal and second control signal to verify the identity thereof.

13 Claims, 1 Drawing Sheet

(51) Int. Cl.
    *G01P 21/00*         (2006.01)
    *G05B 19/39*         (2006.01)

(58) Field of Classification Search
    CPC ........ G05B 2219/37508; G05B 19/406; G05B 19/00; G01P 21/00; G01P 21/02; G01D 3/08
    USPC ........ 73/1.01, 1.16, 1.36, 865.9; 702/33, 45, 702/57, 113; 417/63
    See application file for complete search history.

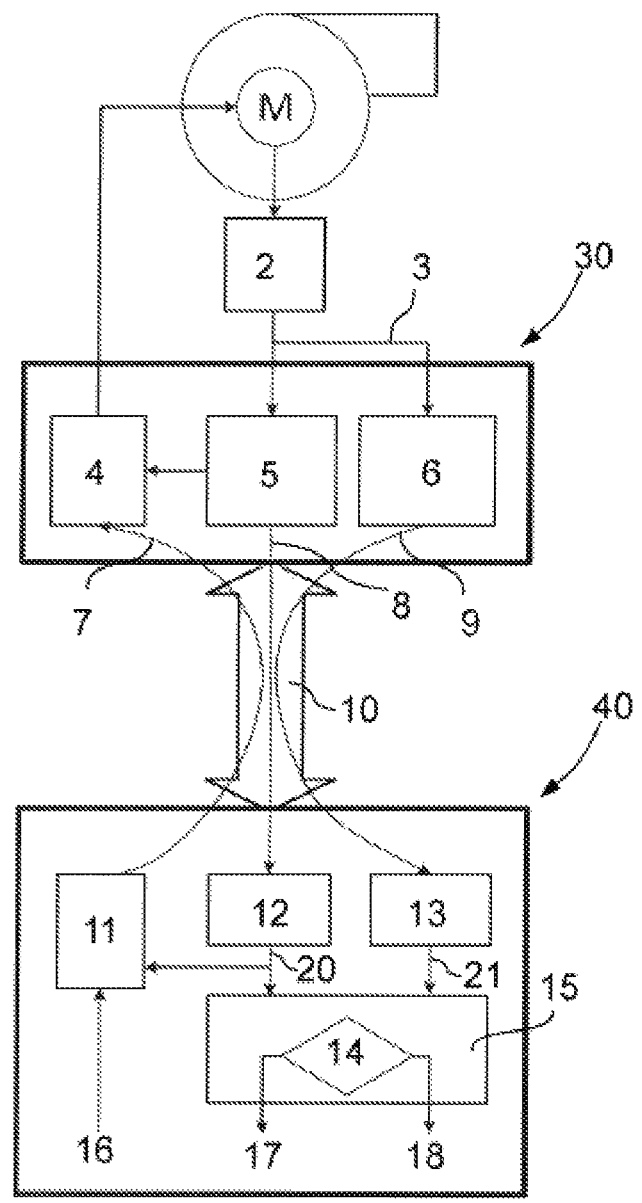

METHOD FOR CHECKING A TIME-DISCRETE SIGNAL VALUE OF A SENSOR FOR FREEDOM FROM ERRORS

The invention relates to a plausibility method for checking a time-discrete signal value of a sensor for freedom from errors.

Particularly with safety-relevant devices, such as gas blowers for example, a fail-safe transmission of time-discrete measured values, in particular the gas fan speed, from a fan electronic system to a gas burner control system is necessary.

It is known from the prior art that the control value for the gas blower and the rotation signal are transmitted on separate electrical paths. Due to safety requirements, it is imperative that the rotation signal is connected to be as error-free as possible, in particular in a redundant manner, to the safety-relevant control system in direct paths. WO 2005/109132 discloses, as a prior art document, a method in which several measured values are recorded and transmitted in a fail-safe manner. In this case, however, redundant devices are required which have cost disadvantages as compared to the prior art.

Therefore, the invention is based on the object of providing a cost-effective method with which discrete-time sensor measured values can be checked for freedom from errors.

This object is achieved by the combination of features according to claim 1.

According to the invention, a method for checking a time-discrete signal value of a sensor for freedom from errors is proposed, in which the signal value of the sensor is converted into a first measured value and a second measured value by two different evaluating devices of an electronic system. The first and second measured values are transmitted from the electronic system to a control system, and the control system calculates a first control signal from the first measured value and a second control signal from the second measured value in parallel thereto. The control system comprises a comparator which compares the first control signal and the second control signal to check the identity thereof.

The comparison of the first control signal and the second control signal preferably takes place in predefined, limited periods of time.

The comparison according to the invention of the first control signal and the second control signal by means of the different evaluating devices of the electronic system makes it possible to subject two redundant, differently recorded measured values to a logical comparison, and to make conclusions about the freedom from errors from the comparison result, i.e. the comparison values are identical; or there is an error, i.e. the comparison values deviate. This results in a plausibility check of the measured values of the sensor and, consequently, safeguarding of the data provided.

For example, fail-safe programmable logic controllers, automatic firing devices, or gas/air composite systems for burners can be used as evaluating devices.

Furthermore, the method is advantageously characterized in that the electronic system and the control system are connected via a serial data connection link, and the first and second measured values are transmitted from the electronic system to the control system serially. This has the advantage that, compared to systems with separate signal transmission, there is no significant additional expense and, at the same time, only one single signal line is required. Preferably, the electronic system is designed as a motor electronic system.

The invention is advantageously used in gas blowers and/or fan motors, wherein the sensor is a rotation sensor, which detects a rotation signal of the fan motor as a time-discrete signal value.

Furthermore, it is provided with the method that the control system is designed as a safety-relevant control system, as they are used in gas/air composite systems.

When the method is used with a fan motor, the first measured value is converted into a first rotational speed, and the second measured value is converted into a second rotational speed. In addition or as an alternative to converting the first and second measured values into the corresponding rotational speed, values equivalent to the rotational speed and/or corresponding values based on different evaluation systems and/or time bases can be used for the conversion.

The two rotational speeds are subsequently compared by the comparator to check the identity thereof. If the first rotational speed is identical to the second rotational speed, the plausibility check has been successfully passed. Otherwise, there is an error, for example in one or both of the evaluating devices or in the data transmission.

As compared to the prior art, all signals required for control can be transmitted via a common serial data transmission link, which includes the transmission of the rotational speed signal. The required safety requirements for fail-safe implementation of the rotational speed signal are fulfilled via the plausibility check.

In one exemplary embodiment, the control system preferably further comprises a rotational speed controller. Alternatively, the rotational speed controller may also be contained in the motor controller. The rotational speed controller calculates a control value from a supplied rotational speed setpoint and from the calculated first or second rotational speed, which is supplied to the motor electronic system via the same serial data transmission link. The motor electronic system supplies energy to the fan motor, sets it in rotation, and regulates its motor speed. Rotational speed control and rotational speed feedback thus occur on one and the same data transmission link.

With the method, it is further provided in one embodiment variant that if a deviation is detected during the comparison of the first control signal and the second control signal, a warning signal is generated. The warning signal can be depicted, for example, by a warning light as an optical display. It is also possible to specify a range which determines the maximum deviations of the first and the second rotational speeds. If the comparison value of the first and the second rotational speeds is outside the range, the fan motor can be placed in emergency mode or switched off.

Other advantageous further embodiments of the invention are characterized in the dependent claims and/or are shown in more detail in the following by means of the FIGURES, along with the description of the preferred embodiment of the invention. The following is shown:

FIG. 1 shows a schematic process sequence using the example of a fan motor.

The fan rotational speed of the fan motor M in FIG. 1 is controlled via the motor electronic system 30, which is connected to the safety-relevant control system 40 via a single serial data connection link 10. The motor electronic system 30 comprises the motor controller 4, evaluating device 5, and further evaluating device 6, which is different from evaluating device 5. The safety-relevant control system 40 comprises the rotational speed controller 11, calculating unit 12, calculating unit 13, and the comparator 15.

The rotational speed of the fan motor M is measured and recorded via the rotation sensor 2. The rotation sensor 2 supplies the rotation signal 3 to evaluating device 5 and to evaluating device 6 in parallel thereto. The evaluating devices 5, 6 each independently convert the rotation signal 3 into a respective measured value 8, 9 with independent evaluating methods, said measured values subsequently being supplied to calculation unit 12 and/or calculation unit 13 of the safety-relevant control system 40 via the serial data connection link 10. The calculation units 12, 13 of the safety-relevant control system 40 calculate respective values for the first rotational speed 20 and the second rotational speed 21 from the two independent measured values 8, 9, with the first and second rotational speeds being supplied to the comparator 15 for a comparison of values. The identity check 14 of the two rotational speeds 20, 21 takes place in the comparator 15 of the safety-relevant control system 40 as a plausibility check. With an identity check, there is an output of OK 18, i.e. the system is functioning correctly; in the event of a deviation, the output is ERROR 17, i.e. there is a malfunction to be remedied, for example, in one or both of the evaluating devices 5, 6 or in the data transmission.

With the evaluation method, for example, the rotation signal from the first evaluating device 5 is converted directly into a rotational speed at fixed time intervals (e.g. every single second), e.g. 8 revolutions/second corresponds to the first measured value. The rotation impulses are continuously counted by the second evaluating device 6, and the respectively current counter reading (e.g. 6 revolutions corresponds to the second measured value) is transmitted to the safety-relevant control system 40. Thus, the comparator 15 can check the measured values, the data transmission, the motor electronic system 30, and the safety-relevant control system 40 for plausibility from the rotational speed information from the first measured value and from two transmitted counter readings of the second measured value as relates to the time (1 second) between the two data transmissions. To the extent that the rotational speed has remained the same up to the next data transmission, one second later in the example, the counter reading of the second evaluating device 6 must have increased by exactly this amount (first measured value=8, second measured value=8+6=14). The rotational speed can be calculated from the difference between the two counter readings and the time between the two transmissions and compared with the transmitted rotational speed value:

First measured value=8 revolutions/second

Second measured value=(14 revolutions−6 revolutions)/second=8 revolutions/second Since each counter has a limited number of decimal places, either a counter overflow takes place in continuous operation, i.e. the counter jumps, for example, from the value 9999 to 0000, or the counter readings must regularly be reset to the value zero. Since the same value could then theoretically be transmitted in successive counter readings, data transmission preferably takes place at irregular intervals. This ensures that counter readings are different and that faults that reset the counter reading incorrectly, for example, in the same time sequence, can be detected.

The rotational speed controller 11 of the safety-relevant control system 40 calculates a control value 7 from a supplied rotational speed setpoint 16 and the calculated first rotational speed 20, said control value being routed to the motor electronic system 30 via the same serial data transmission link 10. The motor electronic system 30 supplies energy to the fan motor M, sets it in rotation, and regulates its motor speed. The data streams all occur via the same serial data connection link 10.

The invention claimed is:

1. A method for checking a time-discrete signal value of a sensor for freedom from errors, wherein the sensor is a rotation sensor (2), the method comprising:
   detecting, via the sensor, a rotation signal of an electric motor as a time-discrete signal value, the electric motor being a fan motor (M),
   converting the time-discrete signal value of the sensor into a first measured value (8) and a second measured value (9) using two different evaluating devices (5, 6) of an electronic system;
   transmitting the first and second measured values (8, 9) from the electronic system to a control system;
   calculating, via the control system, a first control signal from the first measured value (8) and, in parallel thereto, a second control signal from the second measured value (9);
   comparing, via a comparator (15) in the control system, the first control signal and the second control signal to determine if a value of the first control signal and a value of the second control signal are the same.

2. The method according to claim 1, wherein the electronic system and the control system are connected via a serial data connection link (10), the transmitting comprising transmitting the first and second measured values (8, 9) from the electronic system to the control system serially using the serial data connection link (10).

3. The method according to claim 1, wherein the control system is a safety-relevant control system (40) and the calculating is performed using the safety-relevant control system (40).

4. The method according to claim 1, wherein the calculating comprises:
   calculating a first rotational speed (20) to be the first control signal,
   calculating a second rotational speed (21) to be the second control signal, and
   wherein the comparing comprises determining, via the comparator (15), whether the value of the first rotational speed (20 and the value of the second rotational speed (21) are the same.

5. The method according to claim 4, comprising providing a rotational speed controller (11) in at least one of the control system and a motor controller.

6. The method according to claim 5, wherein the electronic system comprises a motor controller, and the rotational speed controller (11) is provided in the motor controller, the method comprising:
   providing at least one of the first rotational speed (20) and the second rotational speed (21) to the rotational speed controller (11),
   calculating, via the rotational speed controller (11), a control value (7) using the at least one of the first rotational speed (20) and the second rotational speed (21),
   providing the control value (7) to the motor controller of the electronic system serially, and
   regulating, using the motor controller and the control value (7), a motor speed of the electric motor.

7. The method according to claim 1, wherein the electronic system is a motor electronic system (30) and the converting is performed using the motor electronic system (30).

8. The method according to claim 1, further comprising:
    detecting a deviation during the comparison of the first control signal and the second control signal whereby the value of the first control signal and the value of the second control signal are not the same, and
    generating a warning signal.

9. The method according to claim 1, wherein the comparing comprises comparing the first control signal and the second control signal in predefined, limited periods of time.

10. The method according to claim 1, wherein the converting comprises operating the two different evaluating devices (5, 6) independently of each other to convert the rotation signal detected by the sensor as the time-discrete signal value into respective ones of the first and second measured values (8, 9).

11. The method of claim 10, wherein one of the two different evaluating devices (5, 6) evaluates its corresponding one of the first and second measured values (8, 9) by converting the rotation signal directly into a rotational speed at fixed time intervals.

12. The method of claim 11, wherein the other one of the two different evaluating devices (5, 6) evaluates its corresponding one of the first and second measured values (8, 9) by counting rotation impulses.

13. The method of claim 11, wherein the calculating, via the control system, further comprises using at least two counter readings corresponding to two of the counted rotation impulses that have occurred over a time interval corresponding to the fixed time intervals.

* * * * *